(No Model.) 3 Sheets—Sheet 1.
E. NORTON.
MACHINE FOR SOLDERING SIDE SEAMS OF CANS.
No. 250,096. Patented Nov. 29, 1881.
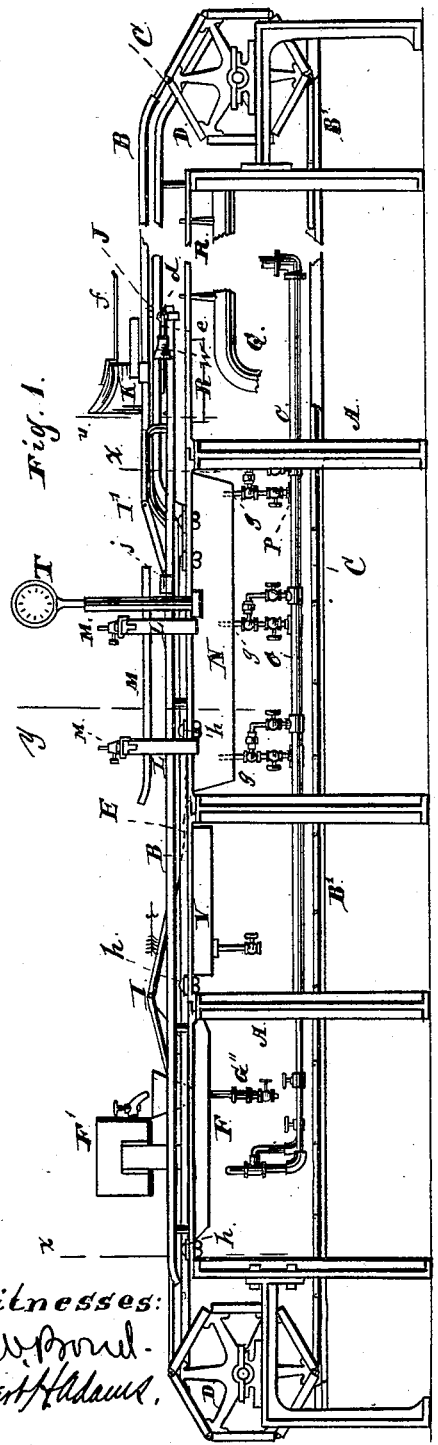
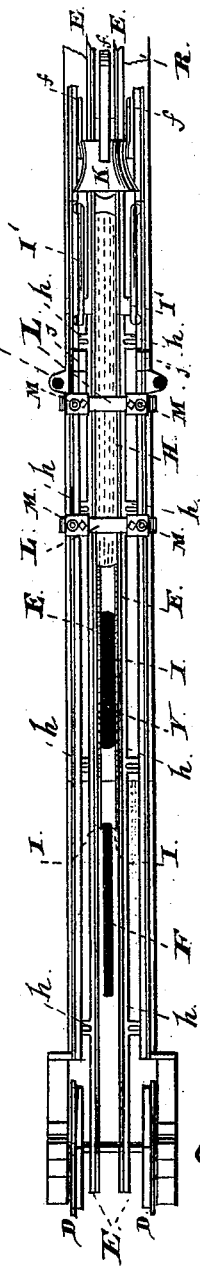
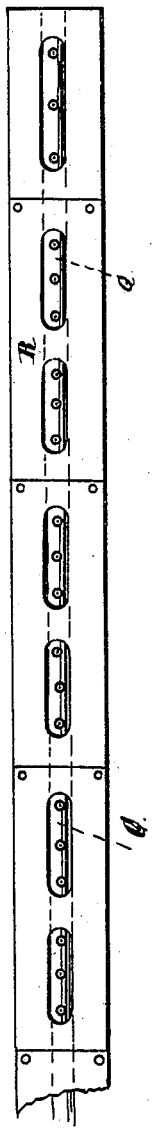
Witnesses:
Inventor:
Edwin Norton (No Model.)   3 Sheets—Sheet 2.
E. NORTON.
MACHINE FOR SOLDERING SIDE SEAMS OF CANS.
No. 250,096.   Patented Nov. 29, 1881.
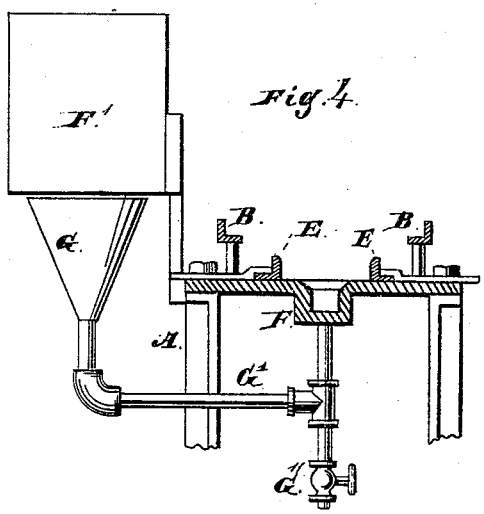
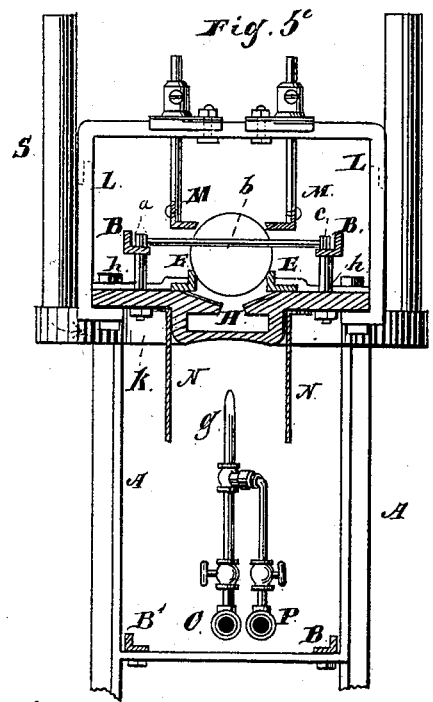
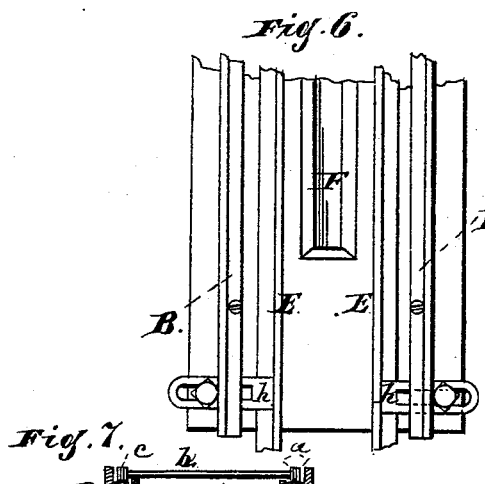
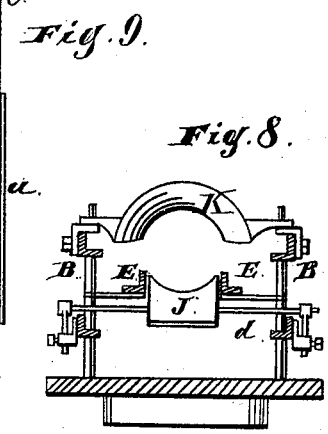
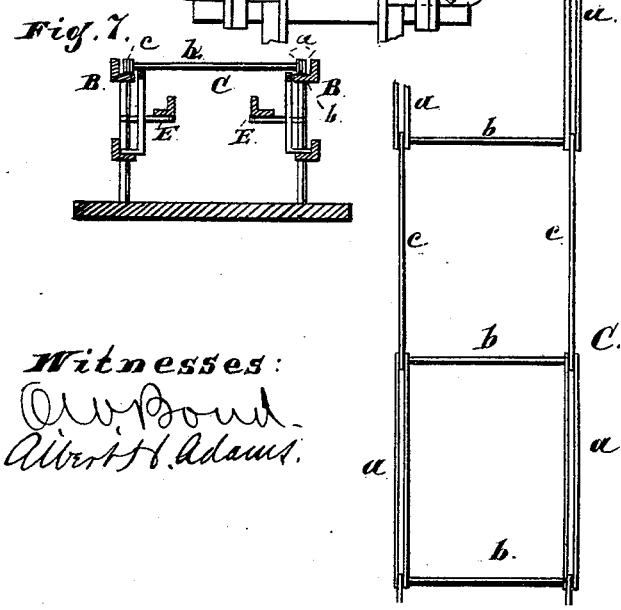
Witnesses:
O. W. Bond
Albert H. Adams
Inventor:
Edwin Norton (No Model.)
E. NORTON.
MACHINE FOR SOLDERING SIDE SEAMS OF CANS.
No. 250,096. Patented Nov. 29, 1881.
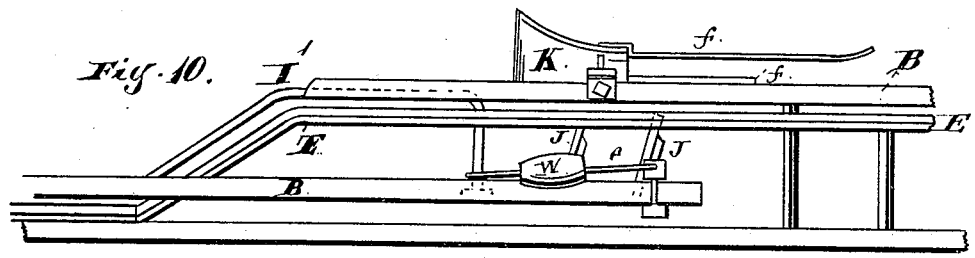
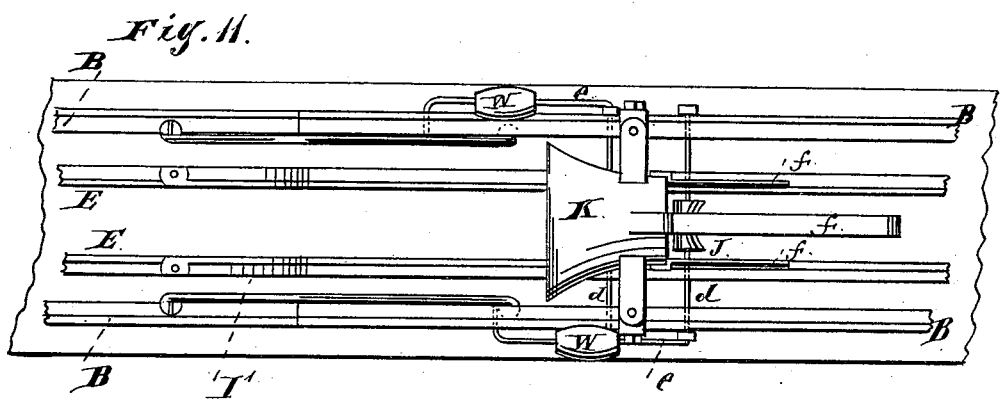
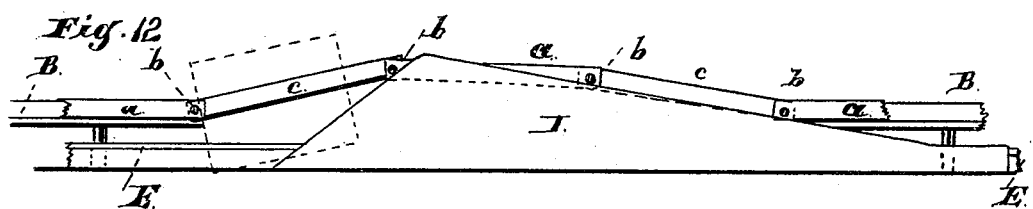
Witnesses: Inventor
Edwin Norton

UNITED STATES PATENT OFFICE.

EDWIN NORTON, OF CHICAGO, ILLINOIS.

MACHINE FOR SOLDERING SIDE SEAMS OF CANS.

SPECIFICATION forming part of Letters Patent No. 250,096, dated November 29, 1881.

Application filed June 15, 1881. (No model.)

To all whom it may concern:

Be it known that I, EDWIN NORTON, residing at Chicago, in the county of Cook and State of Illinois, and a citizen of the United States, have invented a new and useful Improvement in Machines for Soldering Side Seams of Cans, of which the following is a full description, reference being had to the accompanying drawings, in which—

Figure 1 is a side elevation; Fig. 2, a top view of the parts shown; Fig. 3, a plan of the part represented. Fig. 4 is a cross-section at line $x$ of Fig. 1, looking to the right; Fig. 5, a cross-section at line $y$ of Fig. 1. Fig. 6 is a plan of the part shown. Fig. 7 is a cross-section of the parts shown, taken at line $z$ of Fig. 1; Fig. 8, a cross-section of the parts shown, taken at line $u$ of Fig. 1; Fig. 9, a plan of the endless carrier; Fig. 10, a side elevation of the parts shown; Fig. 11, a plan of the parts shown. Fig. 12 is a detail view enlarged, showing the carrier passing over the incline. Several of the figures are enlarged.

This invention relates to improvements in machines for soldering the side seams of tin cans; and it consists, essentially, in the combination of a track upon which the cans are moved, a track for a carrier to move the cans, and a carrier to move the latter, an acid bath, an incline, a solder bath, and a second incline, all as will be more fully hereinafter described.

The invention embraces other features, which will be fully hereinafter described, and pointed out in the claims.

In the drawings, A represents the principal parts of a main frame, which consists of posts and longitudinal and cross bars.

B B' are two tracks.

C is an endless carrier, which moves upon the two tracks B B'. It is made as shown in Fig. 9, and consists of links composed of double side bars, $a$, and transverse rods $b$, connected together, which links are connected together by means of bars $c$, to which the links are hinged. I do not confine myself to this method of constructing the carrier.

D D are two revolving wheels, one at each end of the machine, over which the carrier passes. These wheels are six-sided, each side corresponding to the length of the links and the bars $c\ c$, which are equal to each other.

E E are two parallel bars a little distance apart, upon which the cans are placed, and along which they are drawn by the carrier C. These bars are attached to the main frame so that they can be adjusted relatively to each other, as may be required for cans of different sizes. This may be done by means of slotted bars $h$, secured to the bars E, which bars $h$ are bolted to the main frame.

F is a shallow receptacle for acid, to which acid is supplied from a reservoir, F', from which it passes into the funnel-shaped passage G and through the pipe G' into the receptacle F.

G'' is a pipe through which the acid can be drawn from F when desired.

V is a receptacle into which acid remaining in the can may flow. This part may be omitted.

H is a receptacle for melted solder. I will call F an "acid bath," and H a "solder bath."

The letter I indicates double inclines, bolted or otherwise secured to the bars E, one on each side, and extending upward above the track B.

At I' are two single inclines secured to the bars E and projecting above the track B. In operation the cross-bars $b$ of the carrier C come in contact with and pass up on one side of the incline I, when the cans leave the acid bath, giving them an inclined position, and such rods then pass down on the other side, bringing the cans down to the solder bath.

J is a piece of asbestus or other suitable material, over the upper curved edge of which each can-body passes after it leaves the solder-bath, for the purpose of removing any surplus solder. This piece J is secured to a rod, $d$, suspended in bearings, and it has a rod or lever, $e$, connected to one end, which carries a weight, $w$. Two such pieces of asbestus may be used a little distance apart, as indicated in Figs. 10 and 11. The rod which carries the asbestus is adjustable vertically, as may be required by different sizes of cans.

K is a semicircular hood, the front end of which is flaring, and to the rear end are secured three or more arms, $f$. The hood holds the can in contact with the asbestus, and the arms press gently upon the can while it passes through them and aid in giving the same perfect form.

L L are two arched bars, which are secured to the main frame.

M M are guides, which can be adjusted vertically and laterally upon the bars L.

N are shields extending down from each side of the solder bath to retain the heat from the gas-jets. The solder bath is heated by gas-jets $g$ from the gas-pipe O.

P is an air-pipe, from which currents of air are carried to the gas-jets.

Q is an air-tube, from which jets of air are forced to the under side of the cans to aid in cooling them after they have passed through the solder-bath, which cooling jets pass up through a plate, R. The acid bath is kept warm by a burning gas and air jet.

S is a tube for receiving bars of solder. This tube communicates at its lower end with the solder bath by means of a passage, $k$, and bars of solder placed in S are gradually melted, replenishing the bath H.

T is a pyrometer.

$j$ is a guide. Its office is to hold the carrier in place at this point, so that the portion back of this guide will not be lifted from the track by passage of the carrier up the incline at I'. I place one of these guards on each side of the track and the carrier passes under them.

The operation is as follows: The acid and solder baths are first prepared and brought to the proper temperature. Then an operator places the can-bodies, their ends which form the side seam having been locked together, in any suitable manner, one by one, upon the rails E, near the front end of the acid bath and over the same, with the seam down, and that part of the can where the seam is will then project downward below the rails E far enough to cause the seam to be immersed in the acid bath. The cross-bars $b$ of the carrier C will each come in contact with an end of a can-body, carrying the same along one after another upon the rails E. The seam of the can will first pass through the acid bath F, and as the carrier passes up over the incline I the cans will leave this bath in an inclined position, and a portion at least of the acid which adheres to the can will flow back into the bath F. The carrier will then descend upon the opposite side of the incline I, bringing the seams of the cans down into the solder bath. Then the cans will be carried one after another through the solder bath. The seam passes through the solder, as indicated in Fig. 5, the cans being so arranged that the solder comes into the inside of the cans, covering the whole seam. The air will be expelled from the seam, the solder will flow into all parts of the same, filling and soldering the same perfectly. While in this bath the cans will be held down by the guides M, the same having been first properly adjusted, the cans passing along under these guides. When the cans leave the solder bath they will be carried out in an inclined position, the carrier passing up the incline at I', and a portion of the surplus solder will flow back into the bath H. Then the cans will be carried beneath the hood K and over the asbestus wipers J, and the most of the surplus solder on the outside of the can will be removed thereby, and may fall upon an inclined hot plate, from which it will flow into the bath, or it may flow into a separate receptacle, or the parts may be arranged so that it will fall into the bath. The pressure of the wipers on the cans can be regulated by adjusting the weight $w$ on the rod $e$, connected with the pivoted rod or bar which carries the asbestus. Most of the surplus solder remaining upon the inside of the can will, owing to the inclination of the can on the inside, flow down over the seam, strengthening the same. When the cans leave the hood and wipers they will be drawn through the arms $f$, which will have a tendency to bring the cans to a round form, if not already round, ready for receiving the ends. While passing from this point to the end of the machine the cans may be subjected to blasts of air by means of jets from an air-pipe. When the cans reach the end of the machine they may be allowed to fall into any suitable receptacle.

This machine is adapted to be used in soldering other side seams besides those of cans.

The hood K might be extended to take the place of the arms $f$, which would then be omitted.

The track E must be open to permit the seams of the cans to project below the same.

I have described an acid bath, but do not limit myself to the use of acid, as some other suitable flux may be used.

Heretofore it has been difficult to make a perfect joint between the heads and body of the can at the point where the folded ends of the side seam join the heads, because there has been so much untinned surface at this point that it has been impossible to make the seam strong and uniformly tight at such point. By immersing the seam in a solder bath the ends of the lock-seam are coated with solder and the difficulty mentioned is obviated.

What I claim as new, and desire to secure by Letters Patent, is as follows:

1. In a machine for soldering the side seams of cans, a track upon which the cans are moved, a track for a carrier to move the cans, a carrier to move the cans, an acid bath, an incline, I, a solder bath, and an incline, I', combined substantially as and for the purpose specified.

2. In a machine for soldering side seams of cans, a track for the cans, a carrier to move the cans, and a solder bath, in combination with guides M M, substantially as and for the purposes specified.

3. In a soldering-machine, a wiper, J, for the purpose of removing surplus solder from the outside of the can, in combination with a hood, K, for the purpose of holding the can in contact with the wiper, substantially as specified.

EDWIN NORTON.

Witnesses:
B. A. PRICE,
ALBERT H. ADAMS.